United States Patent
Hori et al.

(10) Patent No.: US 8,275,203 B2
(45) Date of Patent: Sep. 25, 2012

(54) SHEET MUSIC PROCESSING METHOD AND IMAGE PROCESSING APPARATUS

(75) Inventors: Ayumi Hori, Kawasaki (JP); Hidetsugu Kagawa, Kawasaki (JP); Fumihiro Goto, Kawasaki (JP); Manabu Yamazoe, Tokyo (JP); Maya Ishii, Kawasaki (JP); Tohru Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 949 days.

(21) Appl. No.: 12/340,031

(22) Filed: Dec. 19, 2008

(65) Prior Publication Data

US 2009/0161917 A1 Jun. 25, 2009

(30) Foreign Application Priority Data

Dec. 21, 2007 (JP) ................. 2007-331074

(51) Int. Cl.
*G06K 9/00* (2006.01)
*G09B 15/04* (2006.01)
*G09B 15/00* (2006.01)
*G10H 7/00* (2006.01)

(52) U.S. Cl. ............... 382/181; 84/470 R; 84/477 R; 84/602; 84/609

(58) Field of Classification Search .................. None
See application file for complete search history.

(56) References Cited

U.S. PATENT DOCUMENTS

| | | | |
|---|---|---|---|
| 4,958,551 A | 9/1990 | Lui | |
| 5,690,496 A | 11/1997 | Kennedy | |
| 5,706,363 A | 1/1998 | Kikuchi | |
| 5,864,631 A | 1/1999 | Shutoh | |
| 5,931,680 A | 8/1999 | Semba | |
| 6,169,239 B1 | 1/2001 | Aiardo | |
| 6,175,070 B1 | 1/2001 | Naples et al. | |
| 6,333,455 B1 | 12/2001 | Yanase et al. | |
| 6,365,819 B2 | 4/2002 | Yamada | |
| 6,380,471 B2 | 4/2002 | Matsumoto | |
| 6,545,208 B2 | 4/2003 | Hiratsuka | |
| 6,635,815 B2 | 10/2003 | Kosakaya | |
| 6,727,418 B2 | 4/2004 | Matsumoto | |
| 6,945,784 B2 | 9/2005 | Paquette et al. | |
| 7,074,999 B2 | 7/2006 | Sitrick et al. | |
| 7,094,960 B2 | 8/2006 | Ikeya et al. | |
| 7,098,392 B2 | 8/2006 | Sitrick et al. | |

(Continued)

FOREIGN PATENT DOCUMENTS

CA 2120657 A1 7/1995

(Continued)

*Primary Examiner* — Matthew Bella
*Assistant Examiner* — Fred Hu
(74) *Attorney, Agent, or Firm* — Canon U.S.A., Inc. IP Division

(57) ABSTRACT

A sheet music processing method of processing, by an image processing apparatus, image data of sheet music input by an input device, the method comprising setting, by a user using a designation unit of the image processing apparatus, a unit in which the image data of the sheet music is processed; dividing the image data of the sheet music into units corresponding to the unit; determining whether image data of a first one of the units is repeated in one or more others of the units; and processing the image data, when the image data of the first one of the units is determined to be repeated in the one or more others of the units, to append information using the image processing apparatus to the image data of the first one of the units and the image data of the one or more others of the units.

8 Claims, 7 Drawing Sheets

U.S. PATENT DOCUMENTS

| | | |
|---|---|---|
| 7,479,595 B2 | 1/2009 | Shen et al. |
| 7,579,541 B2 | 8/2009 | Guldi |
| 7,649,134 B2 | 1/2010 | Kashioka |
| 7,703,014 B2 | 4/2010 | Funaki |
| 7,728,212 B2 | 6/2010 | Fujishima et al. |
| 7,763,790 B2 | 7/2010 | Robledo |
| 2001/0023633 A1 | 9/2001 | Matsumoto |
| 2002/0005109 A1 | 1/2002 | Miller |
| 2002/0118562 A1 | 8/2002 | Hiratsuka |
| 2003/0005814 A1 * | 1/2003 | Matsumoto ............... 84/477 R |
| 2004/0069115 A1 | 4/2004 | Hiratsuka et al. |
| 2004/0112201 A1 | 6/2004 | Funaki |
| 2005/0016361 A1 | 1/2005 | Ikeya et al. |
| 2005/0016368 A1 | 1/2005 | Perla |
| 2007/0022866 A1 | 2/2007 | Perla |
| 2007/0261536 A1 | 11/2007 | Shen et al. |
| 2007/0295194 A1 | 12/2007 | Reverdin |
| 2008/0092723 A1 | 4/2008 | Sawyer-Kovelman et al. |
| 2008/0156171 A1 | 7/2008 | Guldi |
| 2008/0289477 A1 | 11/2008 | Salter |
| 2009/0013855 A1 | 1/2009 | Fujishima et al. |
| 2009/0158915 A1 | 6/2009 | Ishii et al. |
| 2009/0161164 A1 | 6/2009 | Goto et al. |
| 2009/0161176 A1 | 6/2009 | Yamazoe et al. |
| 2009/0161917 A1 | 6/2009 | Hori et al. |
| 2010/0089221 A1 | 4/2010 | Miller |

FOREIGN PATENT DOCUMENTS

| | | |
|---|---|---|
| JP | 05-035924 A | 2/1993 |
| JP | 06-102869 A | 4/1994 |
| JP | 06-102870 A | 4/1994 |
| JP | 06-102871 A | 4/1994 |
| JP | 06-149235 A | 5/1994 |
| JP | 06-149236 A | 5/1994 |
| JP | 07129156 A | 5/1995 |
| JP | 07-304245 A | 11/1995 |
| JP | 07-311543 A | 11/1995 |
| JP | 2879941 B | 4/1999 |
| JP | 2000-163044 A | 6/2000 |
| JP | 3169142 B | 5/2001 |
| JP | 2002-144664 A | 5/2002 |
| JP | 2003-015636 A | 1/2003 |
| JP | 2003-177745 A | 6/2003 |
| JP | 2003-288075 A | 10/2003 |
| JP | 3801939 B | 7/2006 |

* cited by examiner

SHEET MUSIC PROCESSING METHOD AND IMAGE PROCESSING APPARATUS

BACKGROUND OF THE INVENTION

1. Field of the Invention

The present invention relates to a sheet music creation method and image processing apparatus and, more particularly, to a sheet music processing method and image processing apparatus for analyzing image data of sheet music input from an image input device such as a scanner or multifunctional peripheral, and changing the display form of part of the sheet music in accordance with the analysis result.

2. Description of the Related Art

As low-cost scanner devices become available, an original can be easily scanned and converted into digital data even at home. Inkjet printers have been developed as printing apparatuses, and even a multifunctional peripheral called a multifunction printer capable of not only printing but also scanning images has become popular. A user can use a scanner device and printer device to easily copy his originals and contents at home.

An example of content which enhances user convenience when copied or printed is sheet music. Sheet music expresses music using notes, rests, musical signs, and the like. Sheet music has several notations such as staff notation and tablature. In principal, sheet music is often expressed in black. Especially for a beginner, the readability of sheet music is poor, and it is difficult to read melodies. To solve this problem, there is disclosed a method of changing the colors or shapes of musical signs, notes, and the like to improve readability. For example, Japanese Patent Laid-Open No. 07-311543 discloses a method of coloring and expressing notes in colors assigned to respective scales, and a method of writing arrows on sheet music. Japanese Paten Laid-Open No. 07-304245 discloses a method of coloring and expressing musical signs regarding the tempo and dynamics of a performance and the like, or the background of musical signs in a color different from the color of notes.

SUMMARY OF THE INVENTION

In many cases, a player plays while not only giving attention to notes and the like corresponding to a portion he is playing, but also recognizing a melody within a predetermined range after a musical sign corresponding to a portion he is playing. For this reason, it is desirable that the player can recognize the continuity of a melody from sheet music. The conventional techniques can improve readability by changing the display form of musical signs, notes, and the like, but do not allow the user to recognize the continuity of a melody.

Sheet music as a general book describes information for a performance on the basis of rules built up through the historical development. Sheet music is not convenient for all players. A player edits sheet music so as to easily play for himself by, for example, adding signs to the sheet music or coloring signs. The editing work optimizes sheet music for the player. However, it is very cumbersome for the player to edit sheet music, so demands have arisen for easy editing of sheet music.

According to embodiments of the present invention, a melody repeated in sheet music is analyzed and undergoes image processing to visually discriminate a repeating melody. Some embodiments of the present invention provide a sheet music processing method or image processing apparatus capable of easily creating sheet music from which the player can recognize the continuity of a melody.

Some embodiments of the present invention provide a sheet music processing method of processing, by an image processing apparatus, image data of sheet music input by an input device, the method comprising the steps of setting, by a user using a designation unit of the image processing apparatus, a unit in which the image data of the sheet music is processed; dividing the image data of the sheet music into units corresponding to the unit; determining whether image data of a first one of the units is repeated in one or more others of the units; and processing the image data, when the image data of the first one of the units is determined to be repeated in the one or more others of the units, to append information using the image processing apparatus to the image data of the first one of the units and the image data of the one or more others of the units.

Some embodiments of the present invention provide an image processing apparatus which processes image data of sheet music input by an input device, the apparatus comprising a setting unit configured to set a unit in which the image data of the sheet music is processed; a division unit configured to divide the image data of the sheet music into units corresponding to the unit; a determination unit configured to determine whether image data of a first one of the units is repeated in one or more others of the units; and an image data processing unit configured to, when the determination unit determines that the image data of the first one of the units is repeated in the one or more others of the units, append information to the image data of the first one of the units and the image data of the one or more others of the units.

Further features of the present invention will become apparent from the following description of exemplary embodiments with reference to the attached drawings.

DESCRIPTION OF THE EMBODIMENTS

Figure 1:
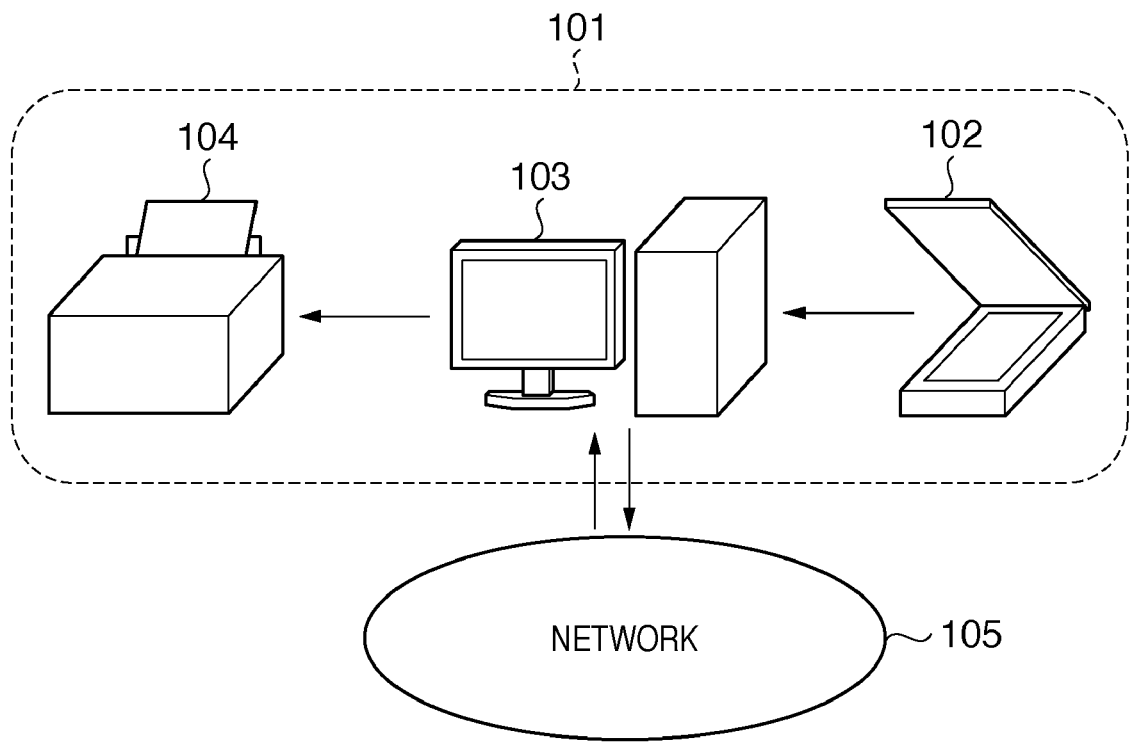
FIG. 1 is a conceptual view showing an example of the configuration of an image processing system according to the present invention.

Embodiments of the present invention will be described in detail below with reference to the accompanying drawings.

The same reference numerals denote the same parts, and a repetitive description thereof will be omitted.

<PC Application>

An embodiment for practicing the present invention using application software running on a personal computer (to be referred to as a PC hereinafter) serving as a host apparatus will be explained.

FIG. 1 is a conceptual view showing an example of the configuration of an image processing system including an image processing apparatus (a PC 103) according to the present invention.

An image processing system 101 in FIG. 1 includes a scanner 102 serving as an image reading apparatus, a PC 103, and a printer 104 serving as a printing apparatus. It is possible to change the layout of sheet music scanned by the scanner 102 and print the resultant sheet music using the printer 104. The PC 103 is connected to an external network 105.

Figure 2:
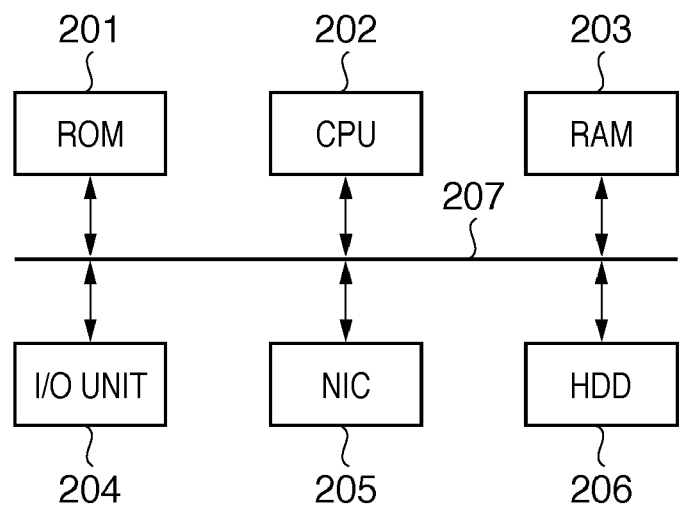
FIG. 2 is a block diagram of the image processing system in FIG. 1.

FIG. 2 is a block diagram of the PC 103 of the image processing system 101 shown in FIG. 1.

In FIG. 2, reference numeral 201 denotes a ROM (Read Only Memory). Reference numeral 202 denotes a CPU (Central Processing Unit). Reference numeral 203 denotes a RAM (Random Access Memory). Reference numeral 204 denotes an I/O (Input/Output) unit. Reference numeral 205 denotes a NIC (Network Interface Card). Reference numeral 206 denotes an HDD (Hard Disk Drive). Reference numeral 207 denotes a bus.

The CPU 202 controls the operation of the overall image processing apparatus (PC 103) via the bus 207 in accordance with a program and data stored in the ROM 201. At the same time, the CPU 202 performs image processing using the RAM 203 as a work memory. For example, the CPU 202 performs image processing for image data input via the I/O unit 204 or NIC 205, or image data stored in advance in a storage medium such as the HDD 206. The CPU 202 outputs the processed image data via the I/O unit 204 or NIC 205, or stores it in a storage medium such as the HDD 206.

For example, the I/O unit 204 is connected via a predetermined interface to an image input/output device such as a monitor (e.g., CRT or LCD), a printer, or a scanner, or a storage device having a storage medium such as a magnetic disk or optical disk. The I/O unit 204 can receive/output image data via the NIC 205 from/to a computer device connected to the storage device and the above-mentioned image input/output device. Examples of the network are Ethernet, FDDI (Fiber Distributed Data Interface), IEEE1394 serial bus, and USB (Universal Serial Bus).

<MFP>

The same effects as those described above can also be obtained using an image processing system in which a single image processing apparatus operates without the mediacy of a PC.

Figure 3:
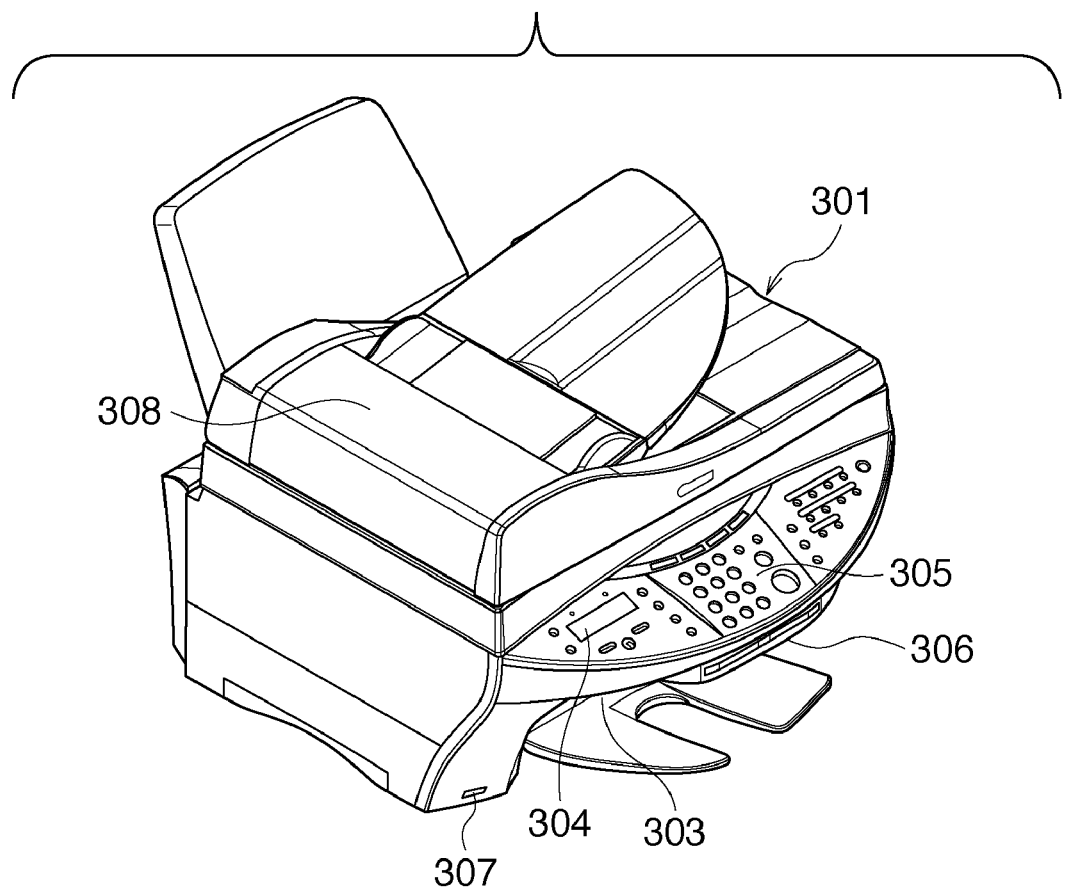
FIG. 3 is a schematic perspective view of the outer appearance of an MFP according to an embodiment of the present invention.
Figure 3:
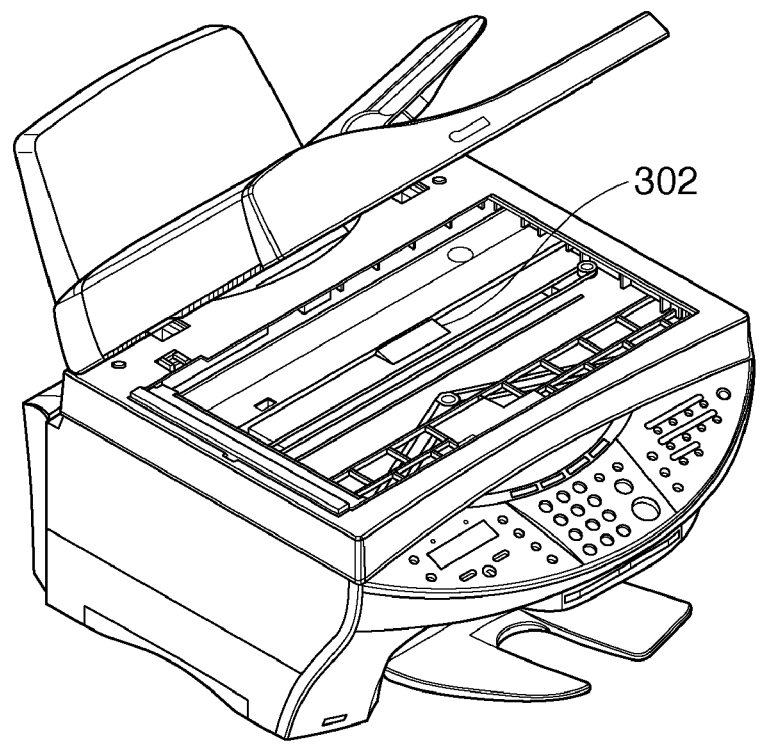

FIG. 3 is a schematic perspective view of the outer appearance of a multi-function printer (to be referred to as an MFP hereinafter) 301 serving as a multifunctional peripheral according to an embodiment of the present invention. The MFP 301 has the function of a general PC printer which receives data from a PC and prints it, and the function of a scanner. Further, the MFP 301 has, as a function executed by a single MFP, a copy function of printing, using a printer, an image scanned by a scanner, a function of directly reading image data stored in a memory card or the like and printing it, or a function of receiving image data from a digital camera and printing it.

In FIG. 3, the MFP 301 includes a reading unit 302 such as a flat-bed scanner, a printing unit 303 of an inkjet type, electrophotography, or the like, a display unit 304 serving as a display panel, and an operation unit 305 serving as an operation panel having various keys, switches, and the like. A USB port (not shown) is provided on the rear surface of the MFP 301 as a PC interface for communicating with a PC, and enables communication with a PC. In addition to these components, the MFP 301 includes a card interface 306 serving as a card slot for reading out data from a variety of memory cards, and a camera interface 307 serving as a camera port for communicating data with a digital camera. Further, the MFP 301 includes an auto document feeder (to be referred to as an ADF hereinafter) 308 for automatically setting an original onto the original table.

Figure 4:
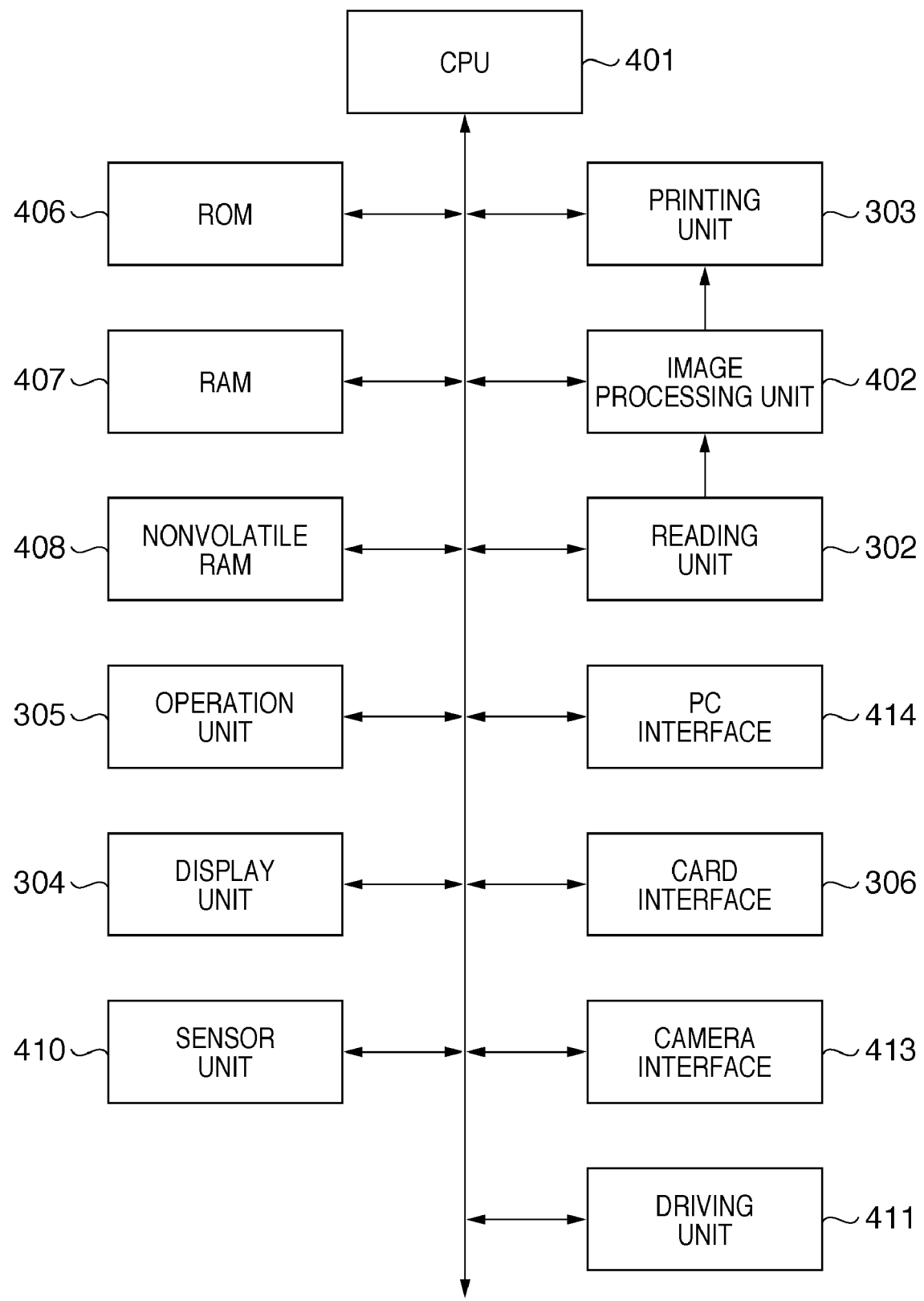
FIG. 4 is a block diagram of the MFP shown in FIG. 3.

FIG. 4 is a block diagram of the image processing system 101 shown in FIG. 3.

In FIG. 4, a CPU 401 controls various functions of the MFP, and executes an image processing program stored in a ROM 406 in accordance with a predetermined operation to the operation unit 305.

The reading unit 302 having a CCD reads an original image to output analog luminance data of red (R), green (G), and blue (B). The reading unit 302 may also include a contact image sensor (CIS) instead of the CCD. When the ADF 308 as shown in FIG. 3 is provided, the reading unit 302 can successively read the original images of order sheets set on the ADF 308.

The card interface 306 receives, in accordance with a predetermined operation to the operation unit 305, image data captured by a digital camera or the like and recorded on a memory card or the like. If necessary, an image processing unit 402 converts image data received via the card interface 306. For example, the image processing unit 402 converts image data corresponding to the color space (e.g., YCbCr) of a digital camera into one corresponding to the RGB color space (e.g., NTSC-RGB or sRGB). If necessary, the received image data undergoes various processing required for a given application, such as resolution conversion into an effective pixel count on the basis of header information of the image data.

A camera interface 413 is directly connected to a digital camera to read image data.

The image processing unit 402 performs image processes (to be described later) such as image analysis, calculation of the conversion characteristic, conversion from a luminance signal (RGB) into a density signal (CMYK), scaling, gamma conversion, and error diffusion. Data obtained by these image processes are stored in a RAM 407. When corrected data stored in the RAM 407 reach a predetermined amount necessary to print by the printing unit 303, the printing unit 303 executes a print operation.

A nonvolatile RAM 408 is, for example, a battery backup SRAM, and stores data unique to the MFP and the like.

The operation unit 305 has a photo direct print start key to select image data stored in a storage medium and start printing, a key to print an order sheet, and a key to read an order sheet. The operation unit 305 also has a copy start key to perform monochrome copying or color copying, a mode key to designate a mode such as resolution or image quality in copying, a stop key to stop a copy operation or the like, a ten-key pad to input the number of copies, a registration key, and the like. The CPU 401 detects the pressed states of these keys, and controls each unit in accordance with the states.

The display unit 304 includes a dot matrix type liquid crystal display (LCD) and LCD driver, and presents various displays under the control of the CPU 401. The display unit 304 displays the thumbnail of image data stored in a storage medium.

The printing unit 303 includes an inkjet head, general-purpose IC, and the like. The printing unit 303 reads out print data stored in the RAM 407, and prints it out as a hard copy under the control of the CPU 401.

A driving unit 411 includes a stepping motor for driving feed and delivery rollers in the operations of the reading unit 302 and printing unit 303, a gear for transmitting the driving force of the stepping motor, and a driver circuit for controlling the stepping motor.

A sensor unit 410 includes a sensor for detecting the width of a print medium, a sensor for detecting the presence/absence of a print medium, a sensor for detecting the width of an original image, a sensor for detecting the presence/absence of an original image, and a sensor for detecting the type of print medium. Based on pieces of information obtained from these sensors, the CPU 401 detects the states of an original and print medium.

A PC interface 414 is an interface between the PC and the MFP. The MFP executes operations such as printing and scanning on the basis of instructions transmitted from the PC via the PC interface 414.

In copying, image data of an original image read by the reading unit 302 is processed in the MFP, and printed by the printing unit 303. When the user designates a copy operation via the operation unit 305, the reading unit 302 reads an original set on the original table. Image data of the read original image is transmitted to the image processing unit 402, and undergoes image processing (to be described later). The processed image data is transmitted to the printing unit 303, and printed.

Figure 5:
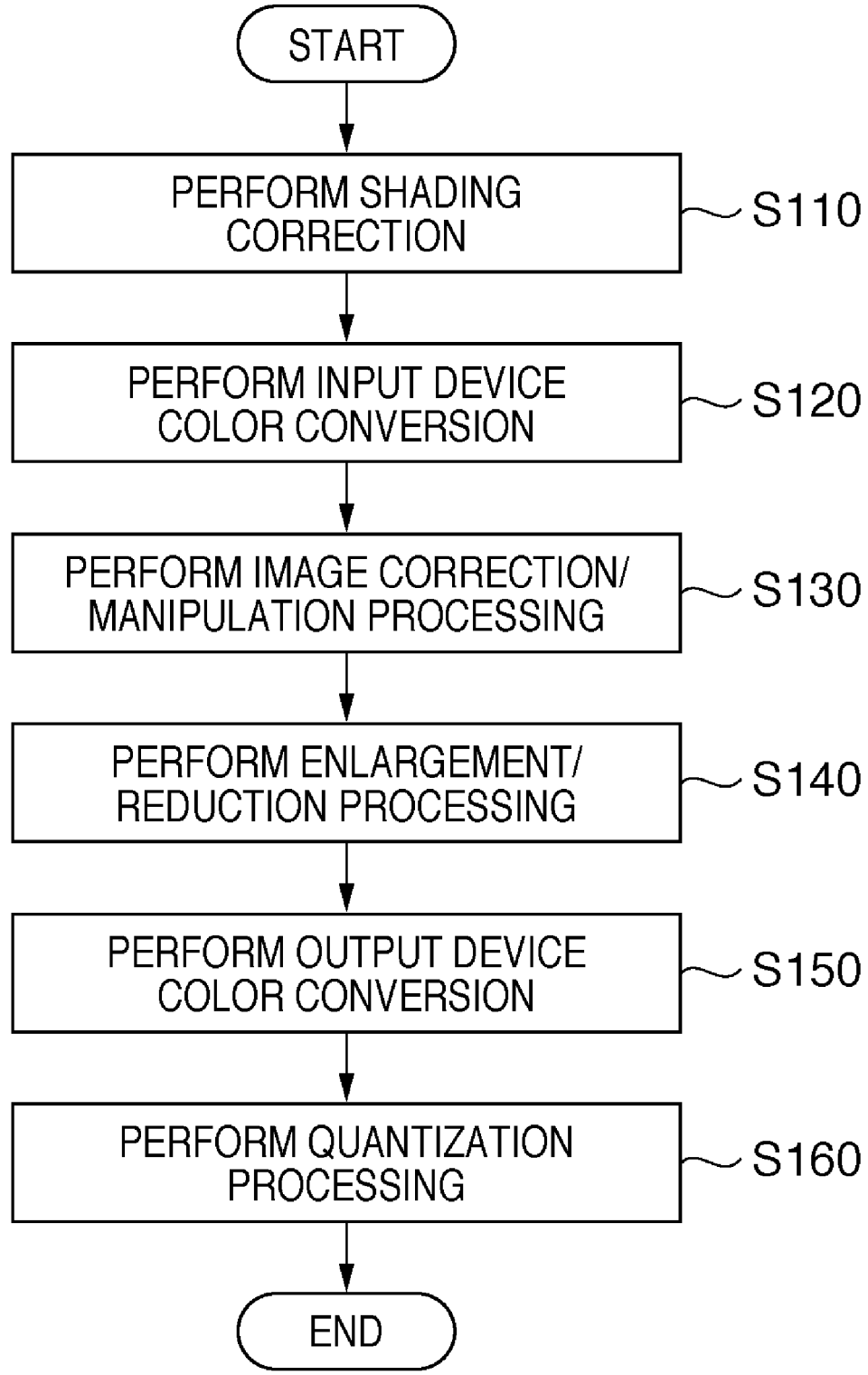
FIG. 5 is a flowchart of image processing executed in copying.

FIG. 5 is a flowchart of image processing executed in copying. Respective steps will be explained, but a detailed description of steps which are not essential to the present invention will be omitted.

In step S110, image data which is read by the reading unit 302 and A/D-converted undergoes shading correction to correct for image sensor variations.

In step S120, the image data undergoes input device color conversion to convert image data corresponding to a color space unique to the reading unit 302 serving as an input device into image data corresponding to a standard color space. More specifically, the image data is converted into image data corresponding to a color space such as sRGB defined by the IEC (International Electrotechnical Commission) or AdobeRGB proposed by Adobe Systems. The conversion method is, for example, an arithmetic method based on a 3×3 or 3×9 matrix, or a look-up table method of looking up to a table describing a conversion rule and deciding a color space on the basis of the table.

In step S130, the image data having undergone color conversion undergoes image correction/manipulation processing. The processing includes edge emphasis processing for correcting blurring generated upon reading an original image, processing for removing offset generated when reading by light irradiation, and character manipulation processing for improving character legibility.

In step S140, enlargement/reduction processing is executed to convert the image data at a desired ratio when the user designates resizing or in layout copying of laying out two original sheets on one paper sheet. The conversion method is generally a bicubic method, nearest neighbor method, or the like. When laying out and printing a plurality of images on one print medium in layout copying or the like, the operations in steps S110 to S140 are repeated to read a plurality of images and lay out the read images on one page. Then, the process shifts to the following print operation. Sheet music image data generation processing according to some embodiments is executed after this processing.

In step S150, the image data corresponding to the standard color space is converted into image data corresponding to a color space unique to an output device. Similar to step S120, the conversion method suffices to be an arithmetic method based on a matrix or the look-up table method. Image data corresponding to the color space unique to the output device is converted into one corresponding to the color space of the colors of inks used in an inkjet MFP, such as cyan, magenta, yellow, and black.

In step S160, the image data undergoes quantization processing. For example, when an ink dot is expressed by a binary value representing whether or not to discharge an ink dot, the image data suffices to be binarized according to a quantization method such as error diffusion. As a result, the image data is converted into a data format printable by the printing unit. The print operation is executed based on the image data of this data format, forming an image.

In the first embodiment, sheet music is created using an MFP. Sheet music image data generation processing as a feature of the present invention will be explained with reference to the flowchart of FIG. 6. As described above, this processing is executed after step S140 of FIG. 5 in some embodiments.

The first embodiment will exemplify the use of digital data (sheet music data) of sheet music obtained by reading the original sheet music by the reading unit of the MFP and digitizing it. Instead of sheet music data, the first embodiment is also applicable to digital data of sheet music distributed on the Internet, or MIDI data generally used as performance data.

In step S210, image data is input to an image processing unit 402. In the first embodiment, the image data is sheet music data obtained by reading the original sheet music using the reading unit of the MFP and digitizing it. When digital sheet music data distributed on the Internet is used as the image data, it suffices to directly input the digital data to the image processing unit 402. When MIDI data is used as the image data, the data is formed in a predetermined format (e.g., SMF file format). Thus, the data is converted into digital data expressed by general signs such as notes and rests, and the converted data is input to the image processing unit 402.

In step S220, image processing parameters necessary to implement the present invention are set. The image processing parameters are the following three types of parameters.

The first parameter designates a unit range for determining whether a set of notes, rests, and the like of sheet music is repeated, in order to execute the following sheet music data manipulation processing. The first parameter will be called a range parameter. As represented by lines 601 and 604 in FIG. 7, staff sheet music 600 is divided by a proper length by bar lines so that the player can easily read the sheet music. A range divided by bar lines is called a bar. The player can easily play if he can easily recognize for each bar that notes, rests, and the like are the same between a given bar and the next one. For this reason, the first embodiment defines one bar as the range parameter.

The second parameter designates the number of bars having the same set of notes, rests, and the like in a given bar when the range parameter is, for example, one bar. When the number of such bars reaches the second parameter, the following sheet music data manipulation processing is executed. The second parameter will be called a count designation parameter.

The third parameter designates a concrete method of processing successive ranges when executing the sheet music data manipulation processing. In other words, the third parameter is a parameter for setting appended information for setting the type of information to be appended to image data. The third parameter will be called a manipulation parameter.

The first embodiment performs the sheet music image data generation processing using the MFP. Parameters recommended as these three types of parameters are stored in advance in a ROM 406, and the recommended parameters are designated and set. Another parameter designation method is a method using a PC application. The parameters are set based on contents designated by the user via the user interface of the PC application. As still another method, it is also possible to arrange designation buttons corresponding to the parameters on the operation panel of an image processing apparatus, accept user instructions from these buttons, and set parameters. In this case, image processing contents which can be designated by the parameters need to be stored in advance in the ROM of the image processing apparatus.

A case where a count of two is set as the count designation parameter, and processing to fill the background image of a target bar in light gray in odd-numbered manipulation and in dark gray in even-numbered manipulation is designated as the manipulation parameter will be explained. When dark gray is expressed using eight bits, R=64, G=64, and B=64. When light gray is expressed using eight bits, R=128, G=128, and B=128.

In step S230, notes, musical signs, and the like are analyzed for one bar designated in step S220.

Figure 7:
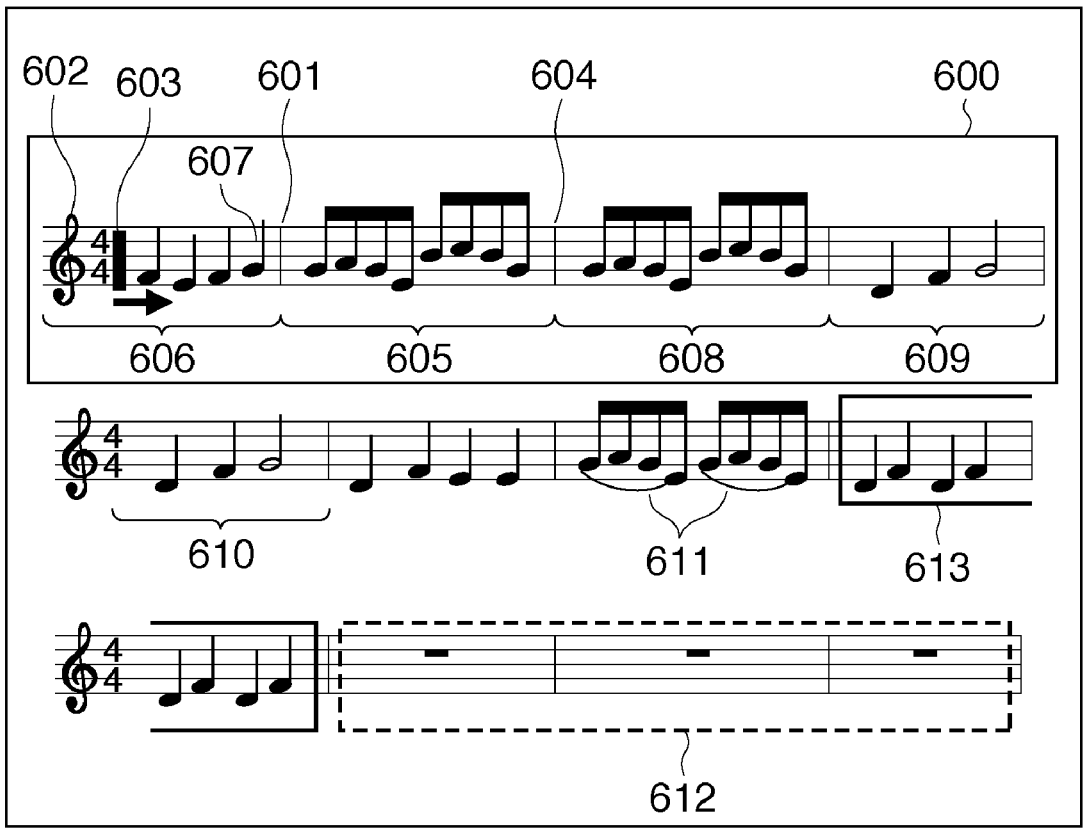
FIG. 7 is a schematic view of sheet music expressed by sheet music data.

First, a method of analyzing the bar line of a bar in sheet music data will be explained. FIG. 7 is a conceptual view of sheet music expressed by sheet music data serving as image data input in step S210.

Sheet music data undergoes skew correction processing. This is because the reading unit may read the original of sheet music with a skew or the original of sheet music itself may be set with a skew. The skew correction processing suffices to use a method of correcting a skew using the staff of sheet music. For example, the image density of read sheet music is calculated at a plurality of angles to create a histogram. When the angle is parallel to the staff, the histogram draws steep curves at portions corresponding to the five lines of the staff. From this, an angle at which the staff becomes parallel to the reading direction is calculated, and the entire image is rotated and corrected. If necessary, a binarization operation may also be done using a fixed or adaptive threshold.

Then, the staff is extracted. The position of the sheet music serving as a reference (reference position of the sheet music) is obtained using staff information from the image data having undergone the skew correction processing by performing, for example, the binarization operation using a fixed or adaptive threshold. A clef (staff start clef) described at the beginning of a staff is a G or F clef. By detecting the G or F clef, the center position of the clef is defined as a staff data start position serving as the reference position of sheet music. The staff start clef can be detected by pattern matching with staff start clefs stored in advance in the ROM 406. The end of the staff can be obtained by detecting the break of the staff.

Figure 8:
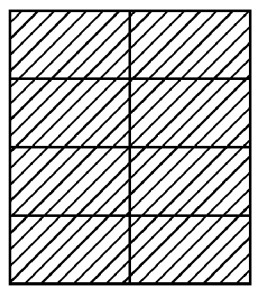
FIG. 8 is a conceptual view when the bar line of a bar appears in a rectangular area serving as the processing unit in the embodiment of the present invention.

The extracted staff is divided into bars. The lines 601 and 604 in FIG. 7 are called the bar lines of the bars. FIG. 7 shows a G clef 602 as a staff start clef on each staff. Thus, the processing to divide each staff into bars starts from the position of the G clef. Reference numeral 603 denotes a processing unit for detecting the bar line of a bar. The processing unit is, for example, a rectangular area defined by a pixel count from the top to bottom lines of the staff in a direction perpendicular to the staff, and a ⅓ pixel count in a direction parallel to the staff. The bar line of a bar is detected while shifting the rectangular area for each processing unit from the center of the G clef in a direction indicated by an arrow in FIG. 7. FIG. 8 is a conceptual view when the bar line of a bar appears in a rectangular area serving as the processing unit. In this manner, the bar line of a bar is detected by detecting a straight line which vertically divides the processing unit. This detection can be easily performed by storing the bar line of a bar as a pattern in a ROM in advance, and executing pattern matching. For example, when the bar line of a bar thins or fades due to deterioration of the original of sheet music, undercolor removal or processing to emphasize the contrast can be performed in image correction/manipulation processing in step S130 of FIG. 5. It sometimes becomes difficult to distinguish the bar line of a bar from the stem of a note like a stem 607 when, for example, the stem of a note extends from the top to bottom lines of the staff. In this case, it suffices to confirm that the head of a note does not exist in a predetermined range. The head can be detected using a technique such as pattern matching, similar to the bar line of a bar. It suffices to set the predetermined range by measuring the distances from the heads to stems of a plurality of types of notes and designating a distance. In this fashion, the bar line of a bar is detected. In FIG. 7, the bar line 604 of a bar is detected next to the bar line 601. A range (bar 605) divided by the bar lines 601 and 604 forms one bar. However, a bar in the start area of a staff is not defined by two bar lines, like a bar 606. In this case, it suffices to recognize, as one bar, a range defined by a staff start clef such as a G clef and the next detected bar line of a bar.

Figure 9:
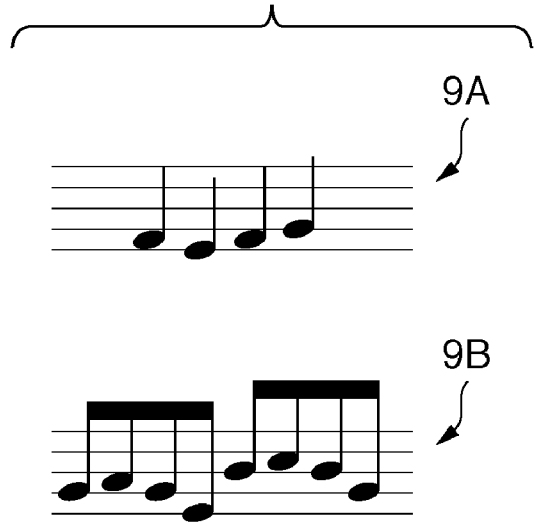
FIG. 9 is a schematic view showing notes and a staff extracted as image data.

After dividing the sheet music data into bars in the above-described way, notes, musical signs, and the like are analyzed for each bar. In FIG. 7, this analysis starts from the bar 606 including a staff start position. The bar 606 has four notes. The notes and staff of the bar 606 as represented by 9A of FIG. 9 are extracted as image data. The extracted image data is stored in a RAM 407, and then the next bar 605 is analyzed. Similar to the analysis of the bar 606, the notes and staff of the bar 605 are also extracted as image data, and the extracted image data is stored in the RAM 407. The notes and staff expressed by the image data are schematically represented by 9B of FIG. 9. In the first embodiment, the count designation parameter is two, so it suffices to store image data of two bars in the RAM 407. For example, when the count designation parameter is three, three image data corresponding to three successive bars need to be stored.

In step S240, it is determined whether the two successive bars extracted and analyzed in step S230 have the same notes, musical signs, and the like. More specifically, the note and staff images of the bars 605 and 606 stored in the RAM 407 in step S230 are superimposed on each other so as to make the staffs match each other.

Figure 10:
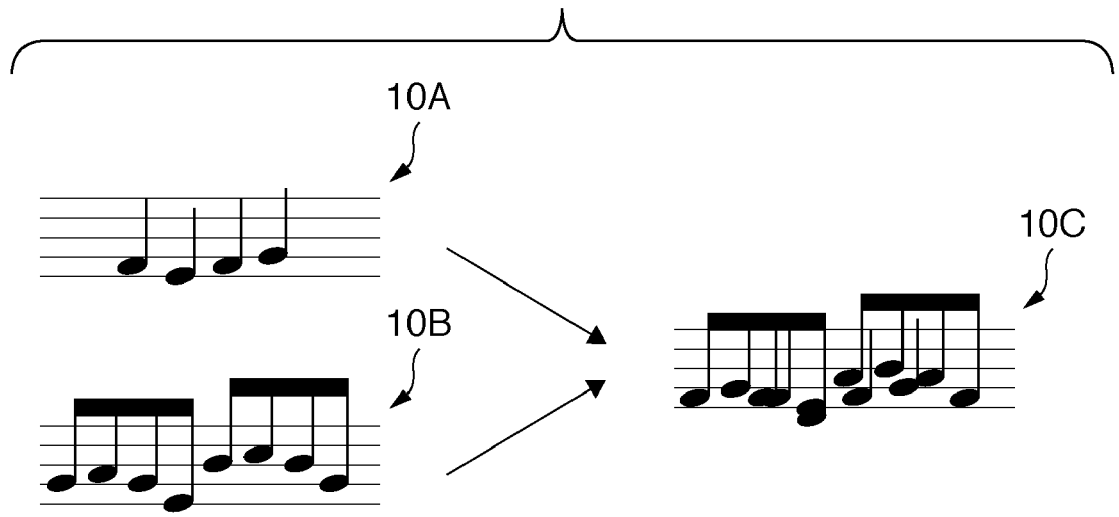
FIG. 10 is a schematic view for explaining determination of whether notes and staffs extracted as image data match each other.

In FIG. 10, 10A and 10B represent the note and staff images of the bars 605 and 606, and 10C represents a conceptual image obtained by superimposing these note and staff images. In this case, the positions and numbers of notes in the bars 605 and 606 do not match each other. Thus, it is determined that these image data are not repetitive data, and the process advances to step S260.

In step S260, the image data of the bar 606 in the RAM 407 is discarded. The image data of the bar 605 remains stored in order to determine whether the bar 605 is identical to the next bar. After that, the process advances to step S270.

In step S270, it is determined whether all bars of the image data have been processed. This image data is one input to the image processing unit 402 in step S210. This image data may be not image data of one piece of sheet music but image data of pieces of sheet music. Analysis of each bar starts from a bar including the G clef of a staff positioned at the top of the sheet music. After a bar at the end (right end) of the same staff is analyzed, a bar including the G clef positioned second from the top is analyzed. This processing is repeated to analyze all bars. More specifically, the processes in steps S230 to S260 are done for each bar.

Image data of the bar 605 and a bar 608 are analyzed in the above-described way to reveal that the positions and numbers of notes in the bars 605 and 608 match each other. Hence, the bars 605 and 608 are subjected to manipulation processing. In step S240, it is determined that the image data of the bars 605 and 608 are repetitive data, and the process advances to step S250.

Figure 11:
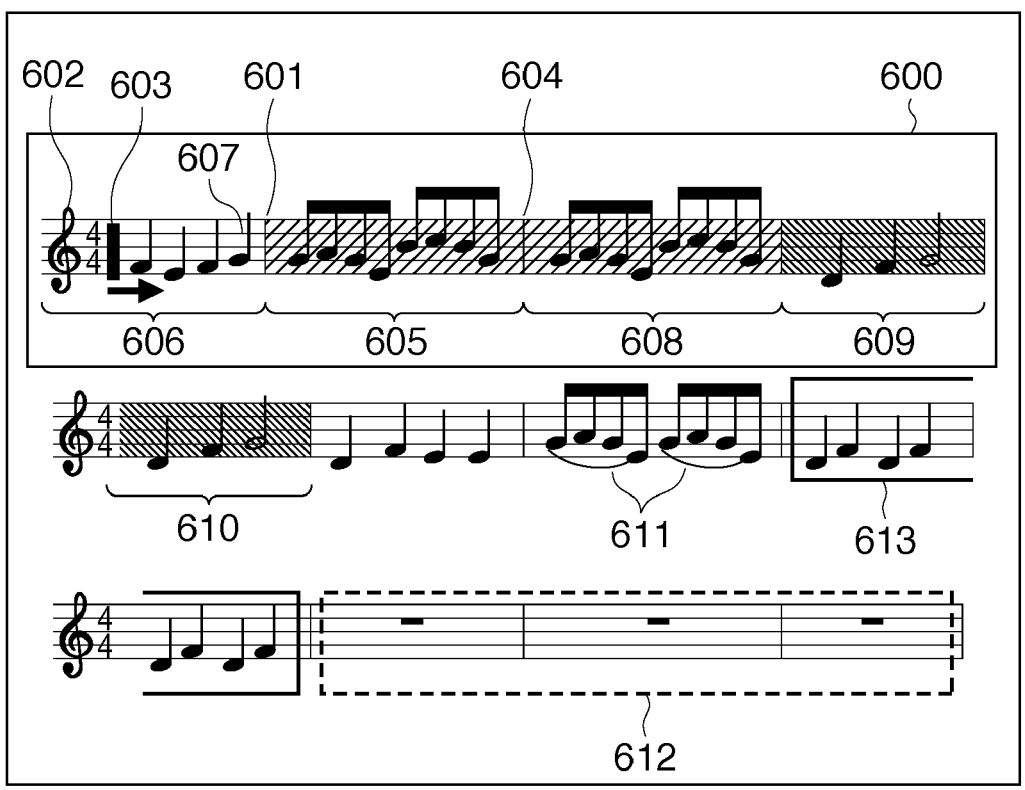
FIG. 11 is a schematic view of sheet music expressed by sheet music data having undergone manipulation processing of the present invention.

In step S250, manipulation processing complying with the manipulation parameter designated in step S230 is executed. More specifically, information is appended to the image data so as to fill these bars in light gray, as represented by the bars 605 and 608 in FIG. 11. Then, the process advances to step S260. The current parameter setting designates a change of color between odd- and even-numbered processes. To discriminate between odd- and even-numbered processes, the memory needs to store the processing count. The processes in steps S230 to S270 are repeated. If it is determined that bars 609 and 610 have repetitive data, these bars are filled in dark gray, as shown in FIG. 11, because the manipulation processing of the bars 605 and 608 is the first, odd-numbered manipulation processing and that of the bars 609 and 610 is the second, even-numbered manipulation processing. In the bar 610 serving as the start bar of a staff, the area of a G clef and time signature is not filled, but may also be filled.

In step S280, the image data having undergone predetermined image processing is output to an output device color converter in the image processing unit 402. Then, the process ends.

The first embodiment has exemplified a case where the range parameter is one bar. The second embodiment will exemplify a case where a different range parameter is set. Assume that the count designation parameter and manipulation parameter are the same as those in the first embodiment.

As one of musical signs, a slur is used to bind several notes in an arc and smoothly play them without a break, as represented by a slur 611 in FIG. 7. The player must play while being aware of a melody (including a melody or a rhythm) in the range of the slur. In the second embodiment, therefore, the range of a note at the start of a slur to a note at its end is set as the range parameter.

Figure 6:
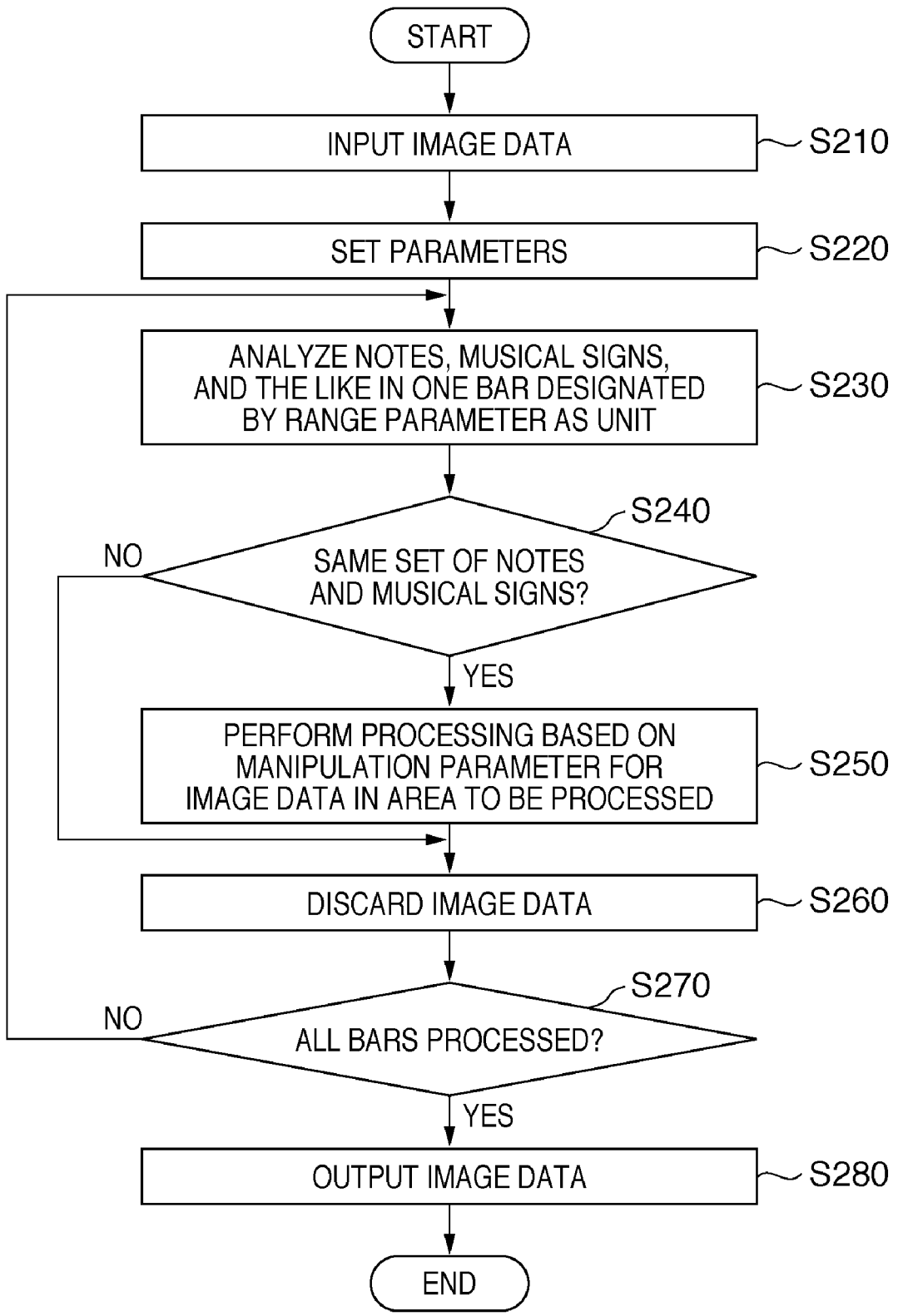
FIG. 6 is a flowchart showing an embodiment of sheet music image data generation processing according to the present invention.

In step S230 of FIG. 6, in order to analyze a slur, concave and convex arcs are used. In step S240, the two types of arcs are enlarged/reduced to execute pattern matching, and it is determined whether a slur exists in image data input in step S210. If a slur exists, it is determined whether another slur successively exists. In FIG. 7, two slurs 611 successively appear. In step S230, notes from the start to end of the slur and the staff are stored as image data in a RAM 407, and the process advances to step S240. Subsequently, the same processing as that in the first embodiment is performed.

The third embodiment will exemplify a case where a range parameter different from those in the first and second embodiments is set.

In the third embodiment, the range parameter is set based on the numbers of rests and notes. In some cases, it is effective to set the range parameter on the basis of the numbers of rests and notes. For example, in a part played by a musical instrument other than one played by the player in sheet music used in an orchestra or the like, rests may be successive in the part of the player. During the performance of this part, for example, the player may turn a page of sheet music or adjust a string. For this reason, it is convenient if the player can easily recognize that rests continue, as represented by 612 in FIG. 7. In some embodiments, the player can easily recognize the ordinal number of a rest in the currently played part. When a beginner, for whom it is difficult to be aware of bars and signs such as a slur, reads sheet music, he can easily recognize it if he knows that a set of several notes is repeated, as represented by 613. Thus, the range parameter can also be set to two notes. Similarly, the range parameter may also be set at a predetermined ratio in the area of the staff, or by designating a predetermined staff length. After the processes in steps S220 to S240 corresponding to this processing, the same processes as those in the first embodiment are executed.

The first embodiment has exemplified a case where repetitive bars are filled in light gray in odd-numbered manipulation and in dark gray in even-numbered manipulation. However, the manipulation parameter may also be set to execute manipulation processing different from that described above.

For example, in the first embodiment, the repetitive bars 605 and 608 in FIG. 11 are filled. Instead, only the second and subsequent bars out of repetitive bars may also be processed. Manipulation processing of filling the background of a bar may also be replaced with manipulation processing of coloring only the heads of notes, manipulation processing of coloring all the heads, stems, and beams of notes, or manipulation processing of coloring only notes at two ends within a bar. Manipulation processing of adding signs such as arrows to margins near notes at two ends within a bar may also be done in addition to coloring. When rests continue, manipulation processing of adding the repetitive count to a margin may also be performed.

The present invention is also practiced by supplying the software program code for implementing the functions of the above-described embodiments to, for example, an apparatus connected to various devices, and operating these devices in accordance with programs stored in the computer of the apparatus or the like.

In this case, the software program code implements the functions of the above-described embodiments, and the program code itself and a means such as a computer-readable storage medium for supplying the program code to a computer constitute the present invention. Concrete examples of the computer-readable storage medium are a flexible disk, hard disk, optical disk, magnetooptical disk, CD-ROM, magnetic tape, nonvolatile memory card, and ROM.

The present invention includes program code when the functions of the above-described embodiments are implemented by executing the program code supplied to the computer. The present invention also includes program code when the functions of the above-described embodiments are implemented by an OS (Operating System) and another application software or the like running on the computer in cooperation with each other.

The functions of the above-described embodiments are also implemented when program code supplied to the computer is stored in the memories of the function expansion board and function expansion unit of the computer, and, for example, the CPUs of the function expansion board and function expansion unit execute processing on the basis of the instructions of the program code. The present invention also incorporates this program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-331074, filed Dec. 21, 2007, which is hereby incorporated by reference herein in its entirety.

What is claimed is:

1. A music score processing method of processing, by an image processing apparatus, image of music score input by an input device, the method comprising the steps of:
    dividing the image of the music score into units;
    determining whether image of a first one of the units is repeated in a second one of the units;
    setting a color for coloring image corresponding to a combination of units determined to be repeated; and
    processing the image of music score, in a case where a plurality of combinations of units are determined to be repeated, to append each of set colors which are different from each other using the image processing apparatus to the image corresponding to each of the plurality of combinations.

2. The method according to claim 1, further comprising the step of:
    setting a number of the units in which repeated image data needs to appear,
    wherein, in the determining step, it is determined whether repeated image data appears in the number of the units.

3. The method according to claim 1, wherein the color to be appended is set for coloring at least either of a note and a rest in the image determined to be repeated.

4. The method according to claim 1, wherein the unit is a bar.

5. The method according to claim 1, wherein the unit is determined based on a number of repeated notes or rests.

6. The method according to claim 1, wherein the input device includes a scanner, and the image of the music score includes image of music score scanned by the scanner.

7. A computer-readable storage medium storing a program for causing an image processing apparatus to execute steps defined in claim 1.

8. An image processing apparatus which processes image of music score input by an input device, the apparatus comprising:
    a division unit configured to divide the image of the music score into units;
    a determination unit configured to determine whether image of a first one of the units is repeated in a second one of the units;
    a setting unit configured to set a color for coloring image corresponding to a combination of units determined to be repeated; and
    an image data processing unit configured to process the image of music score, in a case where the determination unit determines that a plurality of combinations of units are to be repeated, to append each of set colors which are different from each other to the image corresponding to each of the plurality of combinations.

* * * * *